United States Patent [19]

Hashimoto

[11] Patent Number: 4,540,851

[45] Date of Patent: Sep. 10, 1985

[54] REMOTE CONTROL DEVICE USING TELEPHONE CIRCUIT OF ELECTRIC APPARATUS

[75] Inventor: Kazuo Hashimoto, Tokyo, Japan

[73] Assignee: Hashimoto Corporation, Tokyo, Japan

[21] Appl. No.: 567,869

[22] PCT Filed: Jun. 5, 1982

[86] PCT No.: PCT/JP83/00171
§ 371 Date: Dec. 14, 1983
§ 102(e) Date: Dec. 14, 1983

[87] PCT Pub. No.: WO83/04362
PCT Pub. Date: Dec. 8, 1983

[30] Foreign Application Priority Data

Jun. 5, 1982 [JP] Japan .................................. 57-96794
Apr. 9, 1983 [JP] Japan .................................. 58-62562

[51] Int. Cl.³ .......................................... H04M 11/00
[52] U.S. Cl. ..................................................... 179/2 A
[58] Field of Search ............. 179/2 A, 2 AM, 84 VF, 179/6.07, 6.11; 340/825.73–825.76, 825.22–825.24

[56] References Cited

U.S. PATENT DOCUMENTS 3,829,616  8/1974  Blouch ................................. 179/2 A
4,121,053  10/1978  Dick .................................... 179/2 A
4,174,517  11/1979  Mandel ........................... 179/2 A X
4,438,295  3/1984  Hales ................................... 179/2 A Primary Examiner—Gene Z. Rubinson
Assistant Examiner—W. J. Brady
Attorney, Agent, or Firm—Lowe King Price & Becker

[57] ABSTRACT

A remote control device using a telephone circuit of an electric apparatus to remote-control the electric apparatus from a remote location. The electric apparatus is held operative by a loop means for automatically engaging a telephone set with the telephone circuit and a means for enabling the electric apparatus (VTR) when a specific signal or a password is supplied thereto. A remote control signal is supplied to operate means (IC-2) for selecting a desired channel of channels (1CH–12CH) and means (IC-3, 8) for presetting an operation time interval of the electric apparatus, so that the desired channel of the electric apparatus can be selected and the operation time interval can be preset from the remote location. Furthermore, the start time of the electric apparatus can be preset by the remote control signal from the remote location.

8 Claims, 5 Drawing Figures

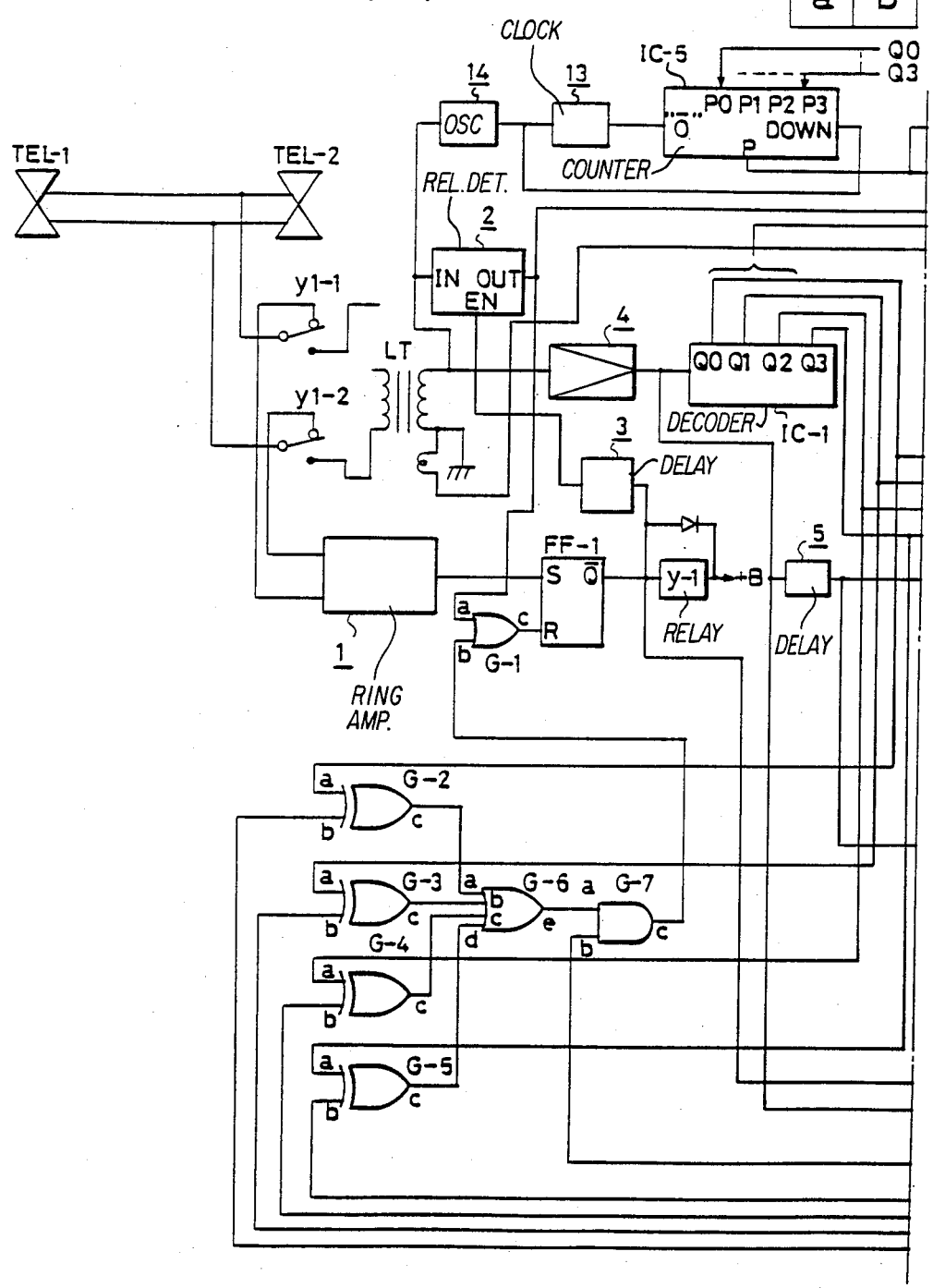

(b)

(a)

(b)

REMOTE CONTROL DEVICE USING TELEPHONE CIRCUIT OF ELECTRIC APPARATUS

TECHNICAL FIELD

The present invention relates to a remote control device using a telephone circuit to remote-control an electric apparatus.

BACKGROUND ART

A remote control device is conventionally known to control an electric apparatus from a remote location by using a telephone circuit. However, in the remote control device of this type, the electric apparatus is simply turned on/off. A desired operation mode cannot be selected in an electric apparatus having different operation modes. For example, if an operator wishes to record a radio or television program from a remote location, the channel of the radio or television station cannot be selected as needed. As a result, only a radio or television program on a tuned frequency or channel can be recorded from the remote location.

In the conventional remote control device using a telephone line, when a control signal is sent from the remote location, an electric apparatus to be controlled is started in response to the control signal. The electric apparatus cannot be started after a predetermined time interval has elapsed since the control signal was sent. The control signal must be sent to the electric apparatus at a time when the operator wishes to start the electronic apparatus. Thus, timer recording cannot be performed, resulting in inconvenience. Furthermore, it is impossible to operate the electric apparatus for a given time interval in accordance with the remote control signal.

DISCLOSURE OF INVENTION

The present invention relates to a remote control device for remote-controlling operation modes of an electric apparatus by using a telephone circuit.

It is a first object of the present invention to provide a remote control device using a telephone circuit to remote-control an operating time interval of an electric apparatus such as a radio or television having a plurality of operation channels (i.e., a plurality of operation modes).

It is a second object of the present invention to provide a remote control device using a telephone circuit to start the electric apparatus for a given time interval only after a predetermined time interval has elapsed.

It is a third object of the present invention to provide a remote control device using a telephone circuit to remote-control the electric apparatus only when a specific signal is sent to the electric apparatus through the telephone line.

It is a fourth object of the present invention to provide a remove control device wherein codes representing an operation mode selection and a preset operation time interval upon presetting the operation mode and the operation time interval are converted to audible signals, and these audible signals are returned as response signals to the operator, so that the operator can confirm the operation mode selection and the preset operation time interval through a telephone line.

It is a fifth object of the present invention to provide a remote control device using a telephone circuit of an electric apparatus to preset the operation mode, the start time and the operation time interval of the electric apparatus from a remote location through the telephone circuit.

It is a sixth object of the present invention to provide a remote control device wherein a signal generated upon depression of a button of a pushphone is used as a remote control signal sent to an electric apparatus through a telephone line.

It is a seventh object of the present invention to provide a remote control device using a telephone circuit of an electric circuit to remote-control a video tape recorder.

It is an eighth object of the present invention to provide a remote control device using a telephone circuit of an electric circuit to be used together with an automatic telephone answering apparatus.

In order to achieve the above objects of the present invention, a remote control device is provided wherein a loop means for automatically engaging a telephone circuit with a pushphone by detecting a tone or ringing signal of the pushphone causes the pushphone to engage with the telephone circuit, and a remote control signal sent from the pushphone is converted by a tone decoder to a code, so that the code may be used to operate a selecting means for selecting a desired operation mode of an electric apparatus having a plurality of operation modes, and to operate a start time preset means for presetting a start time of the electric apparatus and an operation time interval preset means for presetting an operation time interval of the electric apparatus, whereby the operation mode of the electric apparatus is controlled from a remote location through the telephone circuit, and the electric apparatus is operated at a desired start time and for a desired operation time interval.

Furthermore, in order to prevent an unauthorized person (nonsubscriber) from using the electric apparatus, there is also provided a means for operating the electric apparatus in accordance with a code comprising a specific remote control signal or any remote control signal, or the number of times a ringing sound occurs at the time when a subscriber calls a telephone having the remote control device twice in a consecutive manner. In addition to this advantage, when the operation mode and the operation time interval of the electric apparatus are preset in response to the remote control signal, an oscillator for generating an audible signal is operated to send back the audible signal to the subscriber so that the subscriber can audibly confirm the preset conditions. Furthermore, the remote control device of the present invention can also be used together with an automatic telephone answering apparatus.

As has been apparent from the above description, unlike the conventional remote control device wherein the electric apparatus can only be turned on/off even if it has a plurality of operation modes, the remote control device of the present invention allows the subscriber to select a desired operation mode of the electric apparatus having a plurality of operation modes, and to preset the start time and the operation time interval of the electric apparatus from a remote location. The preset operations can be performed only by the sending of a specific signal (i.e., password) by the subscriber possessing the above-mentioned electric apparatus.

BEST MODE OF CARRYING OUT THE INVENTION

Figure 1:
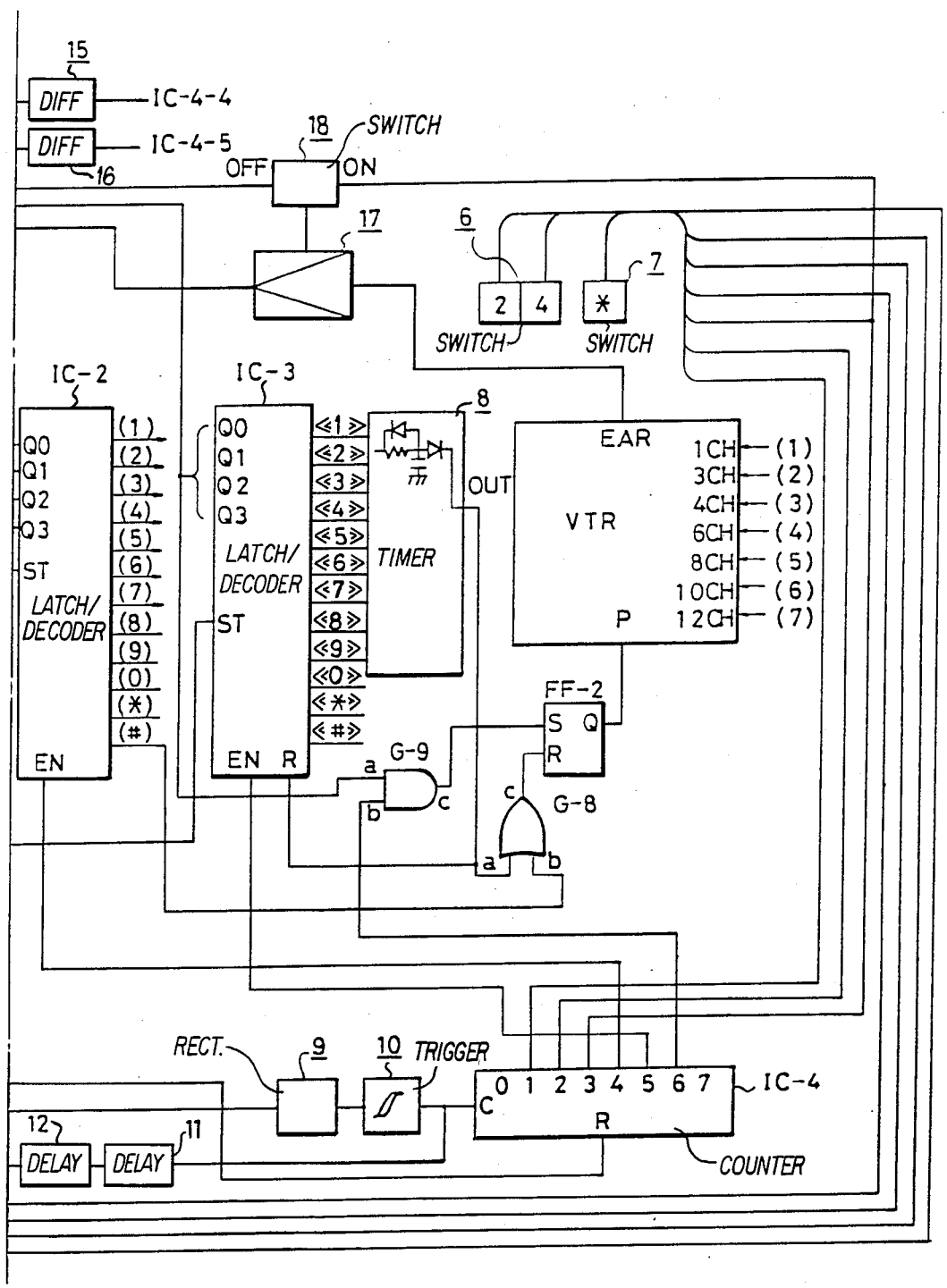
FIGS. 1a and 1b are a circuit diagram of a remote control device according to a first embodiment of the present invention.

FIG. 1 is a circuit diagram of a remote control device according to a first embodiment of the present invention when a VTR (video tape recorder) is used as an electric apparatus to be controlled through a telephone circuit in response to a remote control signal.

Referring to FIG. 1, reference symbol TEL-1 denotes a caller's pushphone; and TEL-2, a receiver's pushphone coupled to the VTR. In this embodiment, pushphones are represented by TEL-1 and TEL-2. However, dial telephone sets may be used in place of the pushphones. Reference symbol LT denotes a line transformer. Reference numeral 1 denotes a ringing amplifier for detecting a ringing signal. Reference symbol FF-1 denotes a flip-flop set in response to an output from the ringing amplifier 1. Reference symbol Y-1 denotes a loop relay controlled in response to an output from the flip-flop FF-1. The loop relay Y-1 has relay contacts y1-1 and y1-2. The ringing amplifier 1, the flip-flop FF-1 and the relay Y-1 constitute a loop means. Reference numeral 2 denotes a momentary release detector for detecting a pulse of high level generated onto a telephone line when the caller performs a series of operations and then hangs up the pushphone TEL-1. Reference numeral 3 denotes a delay circuit for providing a delay time of 1 to 2 seconds so as to prevent erroneous operation of the momentary release detector 2 at the time of loop formation. Reference numeral 4 denotes an amplifier for amplifying a remote control signal (using the tone from the pushphone TEL-1 in this embodiment) from the caller. Reference symbol IC-1 denotes a tone decoder for converting a tone (one tone is a combination of two types of frequencies) to a binary number. Reference symbols IC-2 and IC-3 denote respective latch/decoders for converting the output generated by the tone decoder IC-1 to corresponding data among the decimal numbers (1, 2, . . . , and 0) and symbols (* and #). In particular, the latch/decoder IC-2 constitutes a means for selecting an operation mode (i.e., channel) of the VTR. The latch/decoder IC-3 together with a timer circuit 8 (to be described later) constitutes a means for presetting the operation time interval. Reference numeral 5 denotes a delay circuit for supplying a signal of H level to strobe terminals ST of the latch/decoders IC-2 and IC-3 after a predetermined time (e.g., 0.2 second) has elapsed since an output signal is generated from the amplifier. Reference numeral 8 denotes a timer circuit started in response to an output from the latch/decoder IC-3. In this embodiment, the timer circuit 8 includes eight types of timers. For example, when an output terminal <<1>> of the latch/decoder IC-3 is set at H level, a 15-minute timer is started. Similarly, when an output terminal <<2>> of the latch/decoder IC-3 is set at H level, a 30-minute timer is started. Reference symbol VTR denotes a video tape recorder. Only the terminals of the video tape recorder VTR which are associated with the present invention are illustrated in FIG. 1(b). Reference symbols 1CH, 3CH, 4CH, 6CH, 8CH, 10CH and 12CH denote channel terminals of the video tape recorder VTR. When an output terminal (1) of the latch/decoder IC-2 is set at H level, the channel terminal 1CH is selected. Similarly, when an output terminal (2) of the latch/decoder IC-2 is set at H level, the channel terminal 3CH is selected. When an output indicating the symbol "*" is generated by the tone decoder IC-1, a flip-flop FF-2 is set in response to this output, so that a terminal P goes high. When the terminal P is set at H level, the video tape recorder VTR is energized and starts video recording. When the timer circuit 8 is turned off, the flip-flop FF-2 is reset and at the same time the video tape recorder VTR is also turned off. The caller can receive an audio signal recorded in the video tape recorder VTR from an earphone terminal EAR through the line transformer LT. Reference numeral 9 denotes a rectifier/smoothing circuit for rectifying the tone signal amplified by the amplifier 4. Reference numeral 10 denotes a Schmitt trigger circuit for shaping a DC output. Reference numeral IC-4 denotes a counter for counting the output from the Schmitt trigger circuit 10. A terminal 1 of a counter IC-4 is set at H level in response to the first digit tone signal. A terminal 2 of the counter IC-4 is set at H level in response to the second digit tone signal. When the terminal 1 of the counter IC-4 is set at H level, the first digit (2 in FIG. 1(b)) of a two-digit digital switch 6 is selected. When the terminal 2 of the counter IC-4 is set at H level, the second digit (4 in FIG. 1(b)) of the two-digit digital switch 6 is selected. A terminal 3 of the counter IC-4 selects a code 7. The code 7 corresponds to the symbol "*" in this embodiment and is generated as a corresponding code from a tri-state buffer. The digital switches 6 and 7 constitute a key code preset means. The outputs from the digital switches 6 and 7 are supplied to terminals b of EXOR gates G-2, G-3, G-4 and G-5. The EXOR gates G-2 to G-5 constitute a 4-bit comparator means. The comparator means compares the output from the tone decoder IC-1 with the code from the code preset means. The user of the remote control device enters a key code using the digital switch 6 and sends a remote control signal in accordance with the sequence of the key code. Otherwise, the channel selection of the VTR and the timer preset operation cannot be performed. Reference numeral 11 denotes a delay circuit; and 12, a differentiator. The delay circuit 11 and the differentiator 12 are arranged to detect a coincidence between the decoder output and the code when the remote control signal (tone of the pushphone in this embodiment, as previously described) is stabilized. Reference symbol IC-5 denotes a counter for performing count-down operation when the channel of the video tape recorder VTR has been selected and a corresponding number (e.g., 2 for 3CH) has been set. Reference numeral 13 denotes a multivibrator for generating a clock of about 1 Hz which is used as a count-down clock for the counter IC-5. Reference numeral 14 denotes an audible signal oscillator started in response to the output from the multivibrator 13. The counter IC-5 and the multivibrator 13 constitute a circuit for supplying an intermittent signal in response to the channel number designated by the caller.

The operation of the remote control device having the configuration described above will be described hereinafter. When a ringing signal is received from the pushphone TEL-1 to the pushphone TEL-2, the ringing signal is detected by the ringing amplifier 1. The output from the ringing amplifier 1 causes the flip-flop FF-1 to be set. A $\overline{Q}$ output from the flip-flop FF-1 is supplied to the loop relay Y-1 which is then held operative. A DC loop is formed by the contacts y1-1 and y1-2 through the primary winding of the line transformer LT, so that the pushphone TEL-1 is engaged with the pushphone TEL-2. At the same time, in response to the output from the flip-flop FF-1, the momentary release detector 2 for detecting through the delay circuit 3 in a few seconds whether or not the caller hangs up the pushphone TEL-1 is set to be operative. The caller enters the key code (preset when at home) of the digital switch 6 of the key code preset means. In this embodiment, the caller sends the remote control signal corresponding to the first digit number "2" of "24". Furthermore, in this embodiment, since a pushbutton of the pushphone TEL-1 is used as a key for generating the remote control signal, the caller first depresses a button "2". The tone signal generated by the button "2" is amplified by the amplifier 4 through the line transformer LT and is decoded by the tone decoder IC-1. The tone decoder IC-1 then generates 4-bit binary data from its output terminals Q0 to Q3. In the case of depressing the button "2", the output terminals Q0 to Q3 of the tone decoder IC-1 are set as follows: Q0=L, Q1=H, Q2=L and Q3=L. The signals from the output terminals Q0 to Q3 are supplied to terminals a of the EXOR gates G-2, G-3, G-4 and G-5 (constituting the comparator means) and to input terminals Q0 to Q3 of each of the latch/decoders IC-2 and IC-3, respectively. However, the tone signal corresponding to "2" is supplied to the counter IC-4 through the amplifier 4, the rectifier/smoothing circuit 9 and the Schmitt trigger circuit 10, so that the count of the counter IC-4 is set to be 1. The terminal 1 of the counter IC-4 is set at H level, so that only the first digit of the digital switch 6 becomes operative. Signals of H level are not supplied to terminals EN of the latch/decoders IC-2 and IC-3, and the decoders IC-2 and IC-3 are held inoperative. Therefore, the first digit code from the digital switch is supplied as 4-bit data to terminals b of the EXOR gates G-2, G-3, G-4 and G-5. In this case, the output from the tone decoder IC-1 coincides with the first digit code of the digital switch 6. Terminals c of the EXOR gates G-2, G-3, G-4 and G-5 are set at L level, so that an OR gate G-6 is set at L level. On the other hand, even if the tone signal is input, and a one-shot pulse is supplied to a terminal b of an AND gate G-7 in about 0.2 second through the Schmitt trigger circuit 10, the delay circuit 11 and the differentiator 12, a terminal a of the AND gate G-7 is set at L level during this period. A terminal c of the AND gate G-7 is set at L level, so that the flip-flop FF-1 cannot be reset through an OR gate G-1. As a result, the loop is held unchanged. However, when a tone representing a code different from the number preset by the digital switch is received (e.g., when the caller depresses a pushbutton "1"), the output terminals of the tone decoder IC-1 are set as follows: Q0=H, Q1=L, Q2=L and Q3=L. The terminal a of the EXOR gate G-2 is set at H level and the terminal b thereof is set at L level, so that the output terminal c of the EXOR gate G-2 is set at H level. The terminals a and b of the EXOR gate G-3 are set at L and H levels, respectively, so that the output terminal c thereof is set at H level. When the logic levels of the input signals do not coincide with each other, and when a one-shot pulse from the differentiator 12 is generated, the terminals a and b of the AND gate G-7 are simultaneously set at H level, so that the terminal c thereof is set at H level. Therefore, the flip-flop FF-1 is reset through the terminals a and c of the OR gate G-1, and the relay Y-1 is turned off to disengage the loop. As a result, the VTR cannot be remote-controlled to be described later. Therefore, a third party who does not know the preset number of the digital switch 6 cannot perform remote control operation of the VTR. When the caller sends the tone signal corresponding to "2" and then the tone signal corresponding to "4" as the second digit number of the digital switch 6, the count of the counter IC-4 is apparently set at 2. The terminal 2 of the counter IC-4 is set at H level, so that the second digit of the digital switch 6 becomes operative. The code corresponding to the number "4" is supplied as 4-bit data to terminals b of the EXOR gates G-2 to G-5. The 4-bit data is then compared by this comparator means with the code from the tone decoder IC-1. When a coincidence is established by the comparator means, the loop is kept unchanged. When the caller sends a tone signal corresponding to the symbol "*", and a coincidence is established in the same manner as described above, the loop is kept unchanged. The key code is completely deciphered.

Thereafter, the video tape recoder VTR is directly controlled by tones (remote control signals). The fourth tone signal from the caller is used to select the channel of the video tape recorder VTR. For example, when the caller sends a tone signal corresponding to "4", the count of the counter IC-4 is set at 4, as has been apparent from the above description. A signal of H level is supplied to the terminal EN of the latch/decoder IC-2, so that the latch/decoder IC-2 is held operative. The output terminals of the tone decoder IC-1 are set as follows: Q0=L, Q1=L, Q2=H and Q3=L. These bit signals are supplied to the input terminals Q0 to Q3 of the latch/decoder IC-2 which serves as an operation mode selecting means. Under this condition, when a signal of H level is supplied to the strobe terminal ST of the latch/decoder IC-2 through the delay circuit 5 in a delay time of about 0.2 second, the output from the tone decoder IC-1 is latched by the latch/decoder IC-2 and is decoded. An output terminal (4) of the latch/decoder IC-2 is set at H level, thereby setting the channel terminal 6CH corresponding to the channel 6 of the VTR. In this embodiment, the channel terminals of the VTR are connected to electronic switches, so that the desired channel can be easily selected directly in response to a signal of H level or L level or through transistors. The channel data are stored in the latches even if the count of the latch/decoder IC-2 changes. This is also applicable to the latch/decoder IC-3. When the desired channel is set, a signal of H level is supplied to a terminal P of the presettable down counter IC-5 through a differentiator 15 so as to preset the output from the tone decoder IC-1 in the counter IC-5. Subsequently, the multivibrator 13 is energized through an output terminal $\overline{O}$ of the counter IC-5 to generate a signal having a period of about one second. The output signal from the multivibrator 13 is supplied to drive the audible signal oscillator 14. As a result, a discrete audible signal is produced through the line transformer LT, so that the caller can hear the discrete tones. The counter IC-5 is counted down in response to the output from the multivibrator 13 until the count thereof reaches zero and the terminal $\overline{O}$ goes low. In this embodiment, four discrete tones can be heard by the caller so as to indicate that the channel terminal 6CH goes high (i.e., channel 6 is selected and set). When the caller sends the fifth tone signal, the operating time interval of the VTR can be set. For example, when the tone signal corresponding to the number "2" is sent, the count of the counter IC-4 is set at 5, so that a terminal 5 of the counter IC-4 is set at H level. The terminal EN of the latch/decoder IC-3 as the operation time interval preset means is set at H level, so that the latch/decoder IC-3 is held operative. When the strobe terminal ST of the latch/decoder is set at L level through the delay circuit 5, the output corresponding to "2" from the tone decoder IC-1 is latched by the latch/decoder IC-3. A terminal <<2>> of the latch/decoder IC-3 is set at H level, so that the second timer (e.g., a 30-minute timer) can be set. In this case, the caller can confirm which timer is set in accordance with the discrete audible signals. Furthermore, for illustrative convenience or by way of simplicity, by sending the sixth tone signal corresponding to the symbol "*", a terminal a of an AND gate G-9 is set at H level, and a terminal b of the AND gate G-9 which is coupled to a terminal 6 of the counter IC-4 is set at H level. Therefore, the flip-flop FF-2 is set through the AND gate G-9, thereby releasing the pause mode of the VTR so as to set the terminal P of the VTR at H level. As a result, the VTR starts video recording. When this video recording is started, the caller can hear the audio signals from the earphone terminal EAR through an amplifier 17 and the line transformer LT. Therefore, the caller can reconfirm that the recorded program is a desired one.

Subsequently, when the caller finishes a series of operations and hangs up the pushphone, the momentary release detector 2 detects a pulse of high level transmitted onto the telephone line. The signal from the momentary release detector 2 is supplied to the flip-flop FF-1 through the terminals a and c of the OR gate G-1, so that the flip-flop FF-1 is reset and the relay Y-1 is turned off to open the loop.

On the other hand, in the VTR wherein the timer circuit is preset, recording continues after the loop is opened. When the timer is then turned off, the flip-flop FF-2 is reset through terminals a and c of an OR gate G-8, and the VTR is stopped through the terminal P.

On the other hand, when the caller wishes to stop the VTR during the preset operation time interval, the caller must send the three-digit key code and a tone signal representing the symbol "#". An output terminal (#) of the latch/decoder IC-2 is set at H level, so that the VTR is stopped through the terminals b and c of the OR gate G-8.

When the three-digit key code is sent during video recording after the remote control device is called, the count of the counter IC-4 is set at 3. A signal of H level is supplied from an output terminal 3 of the counter IC-4, so that an electronic switch 18 is turned on. The amplifier 17 is then energized, so that the caller can monitor the selected program through the telephone line. In this case, when the caller hangs up the pushphone TEL-1, the momentary release detector 2 supplies a signal to the electronic switch 18 which is then turned off. As a result, the monitoring operation can be automatically stopped.

Figure 2:
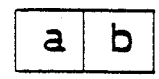
FIGS. 2a and 2b are a circuit diagram of a remote control device according to a second embodiment of the present invention.
Figure 2:
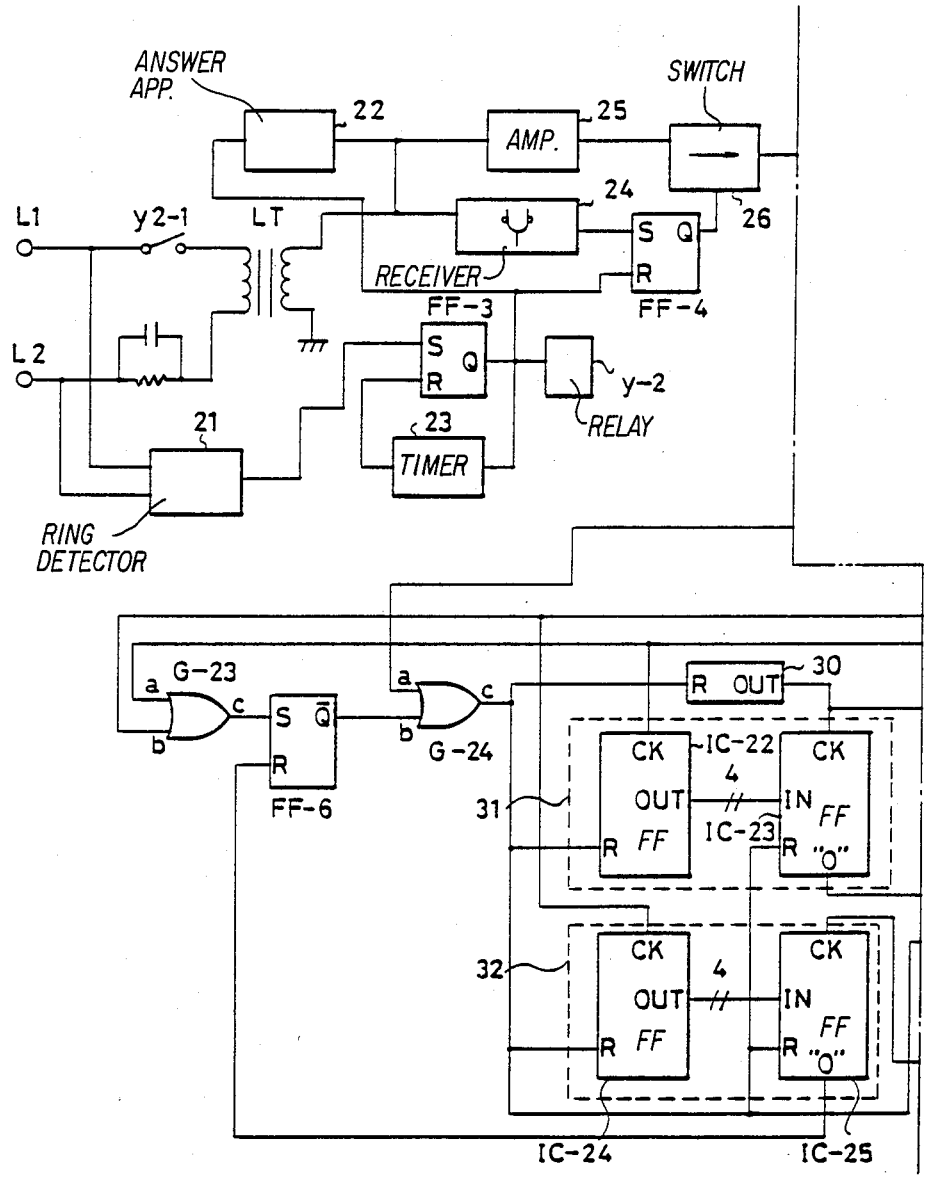
Figure 2:
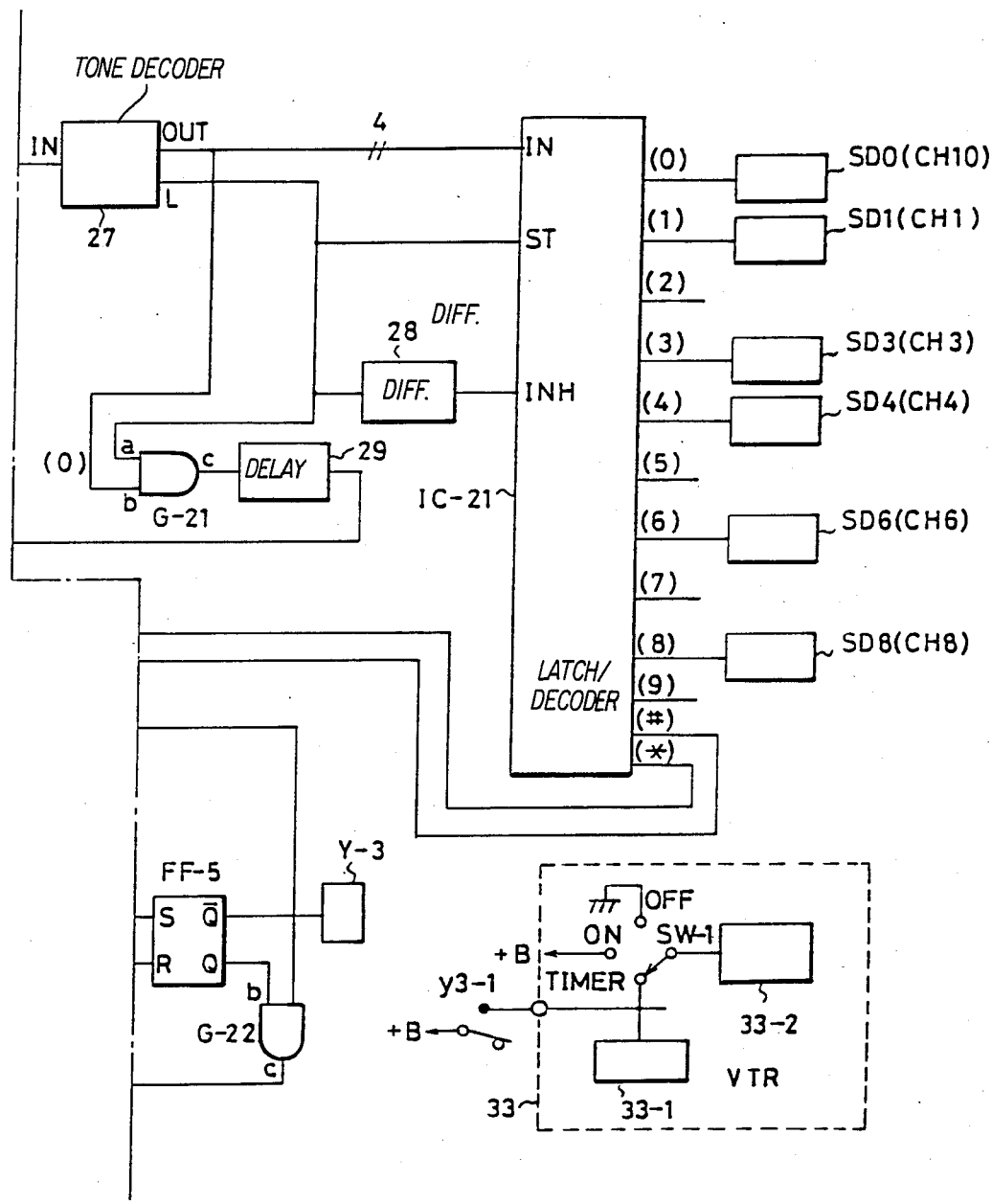

FIG. 2 is a circuit diagram of a remote control device according to a second embodiment of the present invention. Referring to FIG. 2, reference symbols L1 and L2 denote telephone lines; and LT, a line transformer.

Reference numeral 21 denotes a ringing circuit for detecting a ringing signal. Reference symbol FF-3 denotes a flip-flop which is set in response to an output from the ringing circuit 21 and which is reset by a timer 23 in a predetermined time interval (e.g., 30 seconds). Reference symbol Y-2 denotes a relay driven in response to an output from the flip-flop FF-3. The relay Y-2 has a contact y2-1 for forming a loop. The ringing circuit 21, the flip-flop FF-3, the timer 23 and the relay Y-2 constitute a loop means. Reference numeral 24 denotes a remote control receiver for detecting a specific remote control signal sent from a remote location. Reference symbol FF-4 denotes a flip-flop which is set in response to an output from the remote control receiver 24. Reference numeral 26 denotes an analog switch controlled in response to an output from the flip-flop FF-4. Reference numeral 27 denotes a tone decoder for decoding the tone signal from the caller's pushphone at the remote location. Reference symbol IN denotes an input terminal; OUT, a 4-bit output terminal; and L, a latch output terminal which produces a signal of high level when the tone signal is entered at the caller's pushphone. Reference numeral 28 denotes a differentiator for generating a one-shot pulse when the tone signal from the pushphone stops. Reference symbol IC-21 denotes a 4-to-16 latch/decoder (e.g., MC14514). When a terminal ST of the latch/decoder IC-21 is set at H level while a code is supplied from the tone decoder 27 to the input terminal IN, the code is latched in the latch/decoder IC-21. Thereafter, when a negative pulse is supplied from the differentiator 28 to the latch/decoder IC-21, the latch/decoder IC-21 generates a signal of H level while the negative pulse is applied to any one of output terminals (0), (1), . . . , (9), (#) and (*) of the latch/decoder IC-21. Reference symbols SD0 to SD8 denote solenoids driven by the corresponding outputs from the latch/decoder IC-21. For example, when the solenoid SD1 is driven, a button corresponding to channel 1 (CH1) of the VTR is depressed. In the second embodiment, the latch/decoder IC-21 and the solenoids SD0 to SD8 constitute an operation mode selecting means of the electric apparatus. Reference numeral 29 denotes a 3-second delay circuit for generating a signal of high level when three consecutive codes (0) are supplied from the pushphone at the remote location. Reference numeral 30 denotes a 30-minute timer for generating a pulse of H level at intervals of 30 minutes. Reference symbol R denotes a reset terminal for resetting the timer to the start time. Reference numeral 31 denotes a VTR start time preset means which comprises an up counter IC-22 and a presettable down counter IC-23. Reference numeral 32 denotes an operation time interval preset means which comprises an up counter IC-24 and a presettable down counter IC-25. Reference symbol FF-5 denotes a flip-flop which is set when the preset time of the start time preset means occurs. Reference symbol Y-3 denotes a relay driven in response to an output from the flip-flop FF-5. The relay Y-3 has a contact y3-1 for driving the VTR. Reference numeral 33 denotes a VTR. Reference symbol SW1 denotes a power switch. When the power switch SW1 is set at the OFF position, power is withdrawn from a starting circuit 33-2 of the VTR. However, when the power switch SW1 is set at the ON position, the VTR is energized. When the power switch SW1 is set at the TIMER position and when a signal of H level is supplied to the TIMER contact through the contact y3-1 during OFF time of a built-in timer 3301, the VTR is energized.

In the remote control device having the configuration described above, when a ringing signal is supplied to the telephone lines L1 and L2, the flip-flop FF-3 is set in response to the output from the ringing circuit 21. The relay Y-3 which serves as a load is held operative, so that a loop is formed through the contact y2-1 and hence the caller can communicate with the remote control device. At the same time, an automatic telephone answering apparatus 22 is started in response to the output from the flip-flop FF-3 to operate its reproducing and recording function of outgoing and incoming messages. When the caller is an unspecified party, after the caller hears a usual outgoing message, if necessary, the caller records his messages on the automatic telephone answering apparatus 22, making it very convenient to use this apparatus with domestic telephone lines. However, when the caller is the subscriber and possessor of the VTR, he can perform channel selection and time preset operation of the VTR in the following manner. When the automatic telephone answering apparatus 22 is set in the recording mode, a specific remote control signal is sent thereto. The remote control signal is detected by the remote control receiver 24 through the line transformer LT. The output from the remote control receiver 24 is supplied to the flip-flop FF-4 which is then set. Upon setting operation of the flip-flop FF-4, the analog switch 26 is turned on. In this condition, when the subscriber wishes to select channel 4 of the VTR 33, he depresses a button "4" of the pushphone (not shown). In this case, the tone signal generated upon depression of the button "4" is decoded by the tone decoder 27 through the line transformer LT, an amplifier 25 and the analog switch 26. The tone decoder 27 generates 4-bit code data from its output terminal OUT. When this code data becomes stable without chattering caused by depression of the button of the pushphone, the terminal L is set at H level. The signal of high level from the terminal L is supplied to the terminal ST, so that the code applied to the input terminal IN of the latch/decoder IC-21 is latched by the latch/decoder IC-21. Thereafter, when the caller releases the button of the pushphone and then the terminal L of the tone decoder 27 goes from H level to L level, the differentiator 28 generates a negative pulse for, for example, about 0.1 second. The output prohibition of the latch/decoder IC-21 is released for 0.1 second through the terminal INH of the latch/decoder IC-21. In the above embodiment, the terminal (4) of the latch/decoder IC-21 is set at H level, so that the solenoid SD4 is in operation during this interval. The solenoid SD4 depresses the button of channel 4 of the VTR 33, thereby selecting channel 4. The operation will be described wherein video recording is started after one hour for a two hour interval and the VTR is then turned off. For this purpose, when the caller depresses the button "#" of the pushphone (not shown), the output terminal (#) of the latch/decoder IC-21 is set at H level for 0.1 second. An output from the output terminal (#) is used to set the flip-flop FF-6 through terminals a and c of an OR gate G-23. A 30-minute timer 30, the counters IC-22, IC-23, IC-24 and IC-25 of the start time interval preset means 31 and the operation time interval preset means 32 are disabled and the reset state of the flip-flop FF-5 is released. Furthermore, an output from the output terminal (#) of the latch/decoder IC-21 is applied to a clock terminal CK of the up counter IC-22, so that the count of the up counter IC-22 is set at 1. When the caller depresses the button "#" and releases it, the count of the up counter IC-22 is set at 2. The count signal from the up counter IC-22 is supplied to the presettable counter IC-23. Subsequently, when the caller consecutively depresses the button "*" four times, as has been apparent from the above description, the count of the up counter IC-24 of the operation time interval preset means 32 becomes 4. This count is preset in a presettable down counter IC-25.

As described above, when the caller finishes channel selection and operations for the respective preset means, and hangs up the pushphone, the timer 23 supplies a reset pulse to the flip-flop FF-3 in a predetermined time interval. The signal from the flip-flop FF-3 is used to turn off the relay Y-2 to open the loop. On the other hand, the count of the down counter IC-23 of the start time preset means 31 is set at "2" and the count of the down counter IC-25 of the operation time interval preset means 32 is set at "4". However, the 30-minute timer 30 generates a pulse at intervals of 30 minutes. When the 30-minute timer 30 generates the first pulse, the count "2" of the down counter IC-23 is decreased from 2 to one. When the 30-minute timer 30 generates the second pulse, the count of the down counter IC-23 becomes zero. In this case, the terminal $\overline{O}$ of the down counter IC-23 is set at H level. An output of high level from the terminal $\overline{O}$ is supplied to set the flip-flop FF-5, so that the relay Y-3 serving as a load is held operative. Video recording is thus performed through the contact y3-1 of the relay Y-3. In particular, a television program on channel 4 of the VTR 33 is recorded in the VTR 33. Furthermore when the flip-flop FF-5 is set, a terminal b of an AND gate G22 is set at H level, so that the next pulse is supplied from the 30-minute timer 30 to the clock terminal CK of the down counter IC-25 through the AND gate G-22. In the above description, the count of the down counter IC-25 becomes zero in response to four pulses from the 30-minute timer 30 in two hours. The terminal $\overline{O}$ of the down counter IC-25 is set at H level, so that the flip-flop FF-6 is reset. The signal from the flip-flop FF-6 is supplied to the counters IC-22 to IC-25 and the flip-flop FF-5 so as to reset these components. The relay Y-3 is then turned off and the contact y3-1 is opened, thereby stopping video recording of the VTR 33. Unlike the above description, if the caller wishes to immediately start recording and stop it in a predetermined time, the caller must depress and release the button "*" a predetermined number of times. Since the count of the down counter IC-23 of the start time preset means 31 is set at zero, the flip-flop FF-5 is immediately set, and the relay Y-3 is driven.

Figure 3:
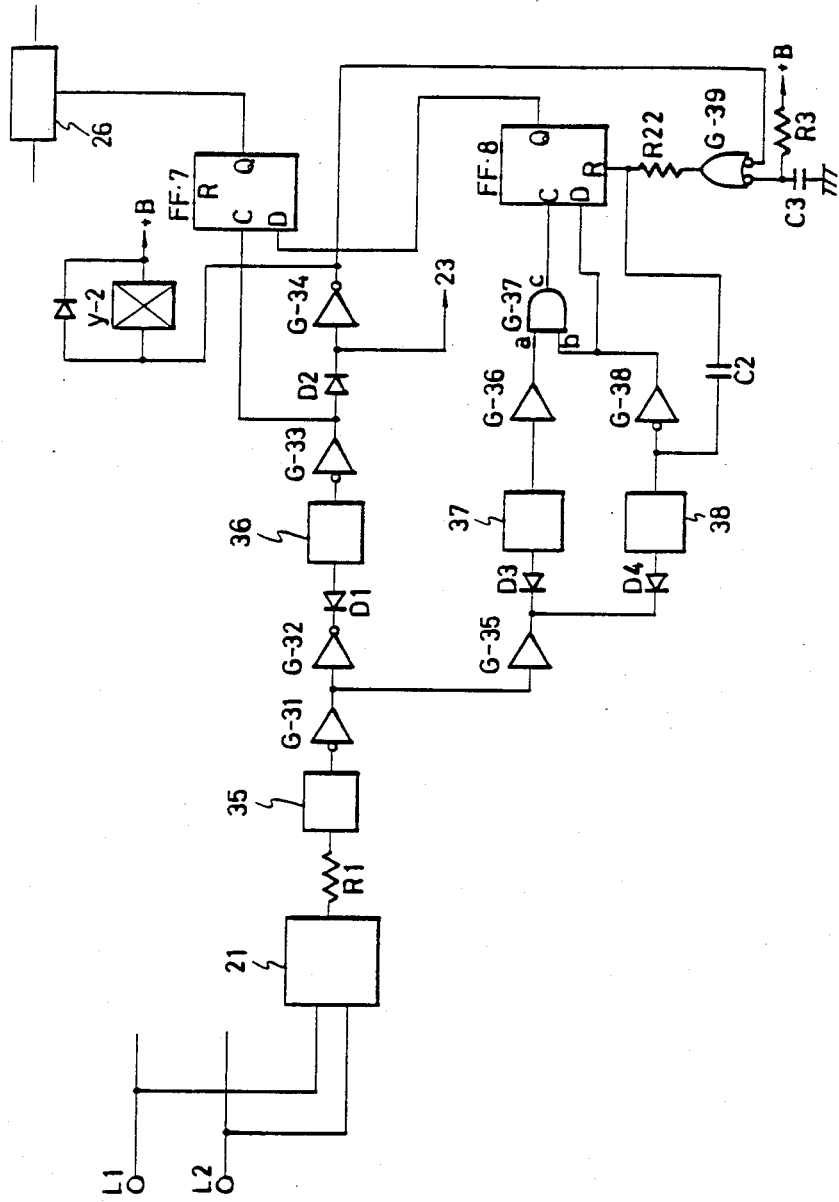
FIG. 3 is a circuit diagram showing the main part of a remote control device according to a third embodiment of the present invention.

FIG. 3 is a circuit diagram showing the main part of a remote control device according to a third embodiment of the present invention. Only the part which differs from the corresponding part of the device shown in FIG. 3 is illustrated in FIG. 3, and the part similar to or the same as the corresponding part of the device shown in FIG. 3 is omitted. Unlike the second embodiment wherein the remote control receiver 24 is operated in response to the specific remote control signal from the remote control signal oscillator 24 so as to select a desired operation mode of the VTR, the remote control apparatus shown in FIG. 3 is arranged such that the desired operation mode is selected in accordance with the way of ringing the bell of the pushphone. The circuit which corresponding to the difference between the remote control devices shown in FIGS. 2 and 3 is illustrated in FIG. 3.

The same reference numerals used in FIG. 2 denote the same parts in FIG. 3. Reference numeral 35 denotes a first time constant circuit which is charged in response to the first ringing signal and which is discharged until the next ringing signal is supplied thereto. The first time constant circuit 35 repeats the charge/discharge operation while the ringing signals are supplied thereto. Reference numeral 36 denotes a second time constant circuit which is charged in response to three ringing signals. Reference numeral 37 denotes a third time constant circuit which is charged in response to the first ringing signal and which is discharged in three seconds after the corresponding ringing signal is stopped. Reference numeral 38 denotes a fourth time constant circuit which is charged in response to the first ringing signal and which is discharged in about 15 seconds after the ringing signal is stopped. Reference symbols FF-7 and FF-8 denote D flip-flops, respectively.

In the remote control device according to the third embodiment of the present invention, when a call is received, the first time constant circuit 35 is charged in response to the first ringing signal. An output from the first time constant circuit 35 is supplied to the third and fourth time constant circuits 37 and 38 respectively through inverters G-31 and G-35, so that the third and fourth time constant circuits 37 and 38 are charged. Under this condition, the caller hangs up the pushphone when he hears a ringing back tone once. In a period from 3 to 15 seconds from this, the third time constant circuit 37 is discharged, a terminal a of an AND gate G-37 is set at H level through a buffer G-36. When the fourth time constant circuit 38 is charged once, a charge is retained in the fourth time constant circuit for 15 seconds. A terminal b of the AND gate G-37 is set at H level, so that a terminal c thereof is set at H level. The flip-flop FF-8 is inverted to the set state through a terminal c thereof (since a terminal D is already set at H level). A terminal D of the flip-flop FF-7 is set at H level. In this state, when the caller calls the remote control device again, the second time constant circuit 36 is charged in response to three ringing signals, so that a terminal c of the flip-flop FF-7 is set at H level through an inverter G-33. The flip-flop FF-7 is thus inverted to the set state, so that an analog switch 26 which is the same as that in FIG. 2 is turned on. The analog switch 26 supplies the tone signal from the pushphone to a tone decoder 27. As a result, the desired channel of the VTR 33 is selected and the start time and the operation time interval of the VTR 33 can be preset.

I claim:

1. An electric apparatus, connected to a telephone circuit and incorporating means for operation of the electric apparatus in response to reception of a code over the telephone line consisting of "dialed" or "push button-entered" numbers, said means comprising: loop means for automatically engaging a telephone set with the telephone circuit by detecting a ringing signal from the telephone set; an electric apparatus having a plurality of operation modes to be selected; a tone decoder for converting a remote control signal transmitted through the telephone circuit to a code after a loop is formed by said loop means; key code preset means; comparator means for comparing a key code preset by said key code preset means and the key code supplied by the remote control signal and converted by said tone decoder; means for disengaging the loop engaged by said loop means in accordance with a noncoincidence signal from said comparator means; selecting means for selecting a desired operation mode of said electric apparatus in accordance with an output from said tone decoder; operation time interval preset means for presetting an operation time interval of said electric apparatus in accordance with the output from said tone decoder; a counter for setting an output for selecting the operation mode and/or the operation time interval of said electric apparatus from said tone decoder; pulse generating means for generating pulses the number of which corresponds to a count set in said counter; and audible signal oscillating means for transmitting an audible signal onto the telephone circuit in response to an output from said pulse generating means.

2. An electric apparatus according to claim 1, wherein said electric apparatus comprises a video tape recorder.

3. An electric apparatus according to claim 1, wherein the remote control signal is a signal generated upon depression of a button or a pushphone.

4. An electric apparatus according to claim 3, wherein the remote control signal for selecting the operation mode of said electric apparatus and the remote control signal for presetting the operation time interval thereof are signals generated by numeric buttons of said pushphone.

5. An electric apparatus, connected to a telephone circuit and incorporating means for operation of the electric apparatus in response to reception of a code over the telephone line consisting of "dialed" or "push button-entered" numbers, said means comprising: loop means for automatically engaging a telephone set with the telephone circuit by detecting a ringing signal of the telephone set; a tone decoder for converting to a code a remote control signal generated by various buttons of a pushphone and transmitted through the telephone circuit after a loop is formed by said loop means; selecting means for selecting a desired operation mode of said electric apparatus in accordance with an output from said tone decoder corresponding to a remote control signal generated by numeric buttons of said pushphone; start time preset means for presetting a start time of said electric apparatus in accordance with the number of outputs generated by said tone decoder which correspond to a remote control signal by a specific button other than the numeric buttons of said pushphone; and operation time interval preset means for presetting the operation time interval after the start time of said electric apparatus in accordance with the number of outputs generated from said tone decoder which correspond to a remote control signal generated by a button other than the numeric buttons and the specific button of said pushphone.

6. An electric apparatus according to claim 5, wherein said tone decoder is enabled when a specific remote control signal is supplied thereto.

7. An electric apparatus according to claim 5, wherein said electric apparatus comprises a video tape recorder.

8. An electric apparatus according to claim 5, wherein an automatic telephone answering apparatus is connected to said remote control device, and a remote control operation of said electric apparatus is recorded on an incoming tape of said automatic telephone answering apparatus.

* * * * *

UNITED STATES PATENT AND TRADEMARK OFFICE
CERTIFICATE OF CORRECTION

PATENT NO. : 4,540,851
DATED : September 10, 1985
INVENTOR(S) : Kazuo HASHIMOTO

It is certified that error appears in the above-identified patent and that said Letters Patent is hereby corrected as shown below:

IN THE DRAWINGS:

Figures 1(a), 1(b), 2(a), 2(b), and 3 to be corrected as follows:

Figure 1(a) to be correct should include the addition of a missing line, to show that relay y1-1 is electrically connected to the line transformer LT.

Figure 1(b) to be correct must identify block 12 as a "DIFFERENTIATOR".

Figure 2(a), in block FF-3 should correctly show $\bar{Q}$ instead of Q.

Figure 2(b), "DIFF" outside block 28 should be deleted.

Figure 3 to be correct should show inverter G-35 symbolically, in a manner similar to G-32.

Signed and Sealed this

Twenty-ninth Day of July 1986

[SEAL]

Attest:

DONALD J. QUIGG

Attesting Officer

Commissioner of Patents and Trademarks